(12) United States Patent
Lin et al.

(10) Patent No.: US 10,902,805 B2
(45) Date of Patent: Jan. 26, 2021

(54) PIXEL STRUCTURE

(71) Applicant: Au Optronics Corporation, Hsinchu (TW)

(72) Inventors: Hung-Che Lin, Hsinchu (TW); Cheng-Han Tsao, New Taipei (TW); Sheng-Ju Ho, Hsinchu (TW); Shang-Jie Wu, Yunlin County (TW)

(73) Assignee: Au Optronics Corporation, Hsinchu (TW)

( * ) Notice: Subject to any disclaimer, the term of this patent is extended or adjusted under 35 U.S.C. 154(b) by 101 days.

(21) Appl. No.: 16/182,614

(22) Filed: Nov. 7, 2018

(65) Prior Publication Data
US 2019/0073975 A1 Mar. 7, 2019

Related U.S. Application Data

(62) Division of application No. 14/700,157, filed on Apr. 29, 2015, now Pat. No. 10,163,412.

(30) Foreign Application Priority Data

Nov. 19, 2014 (TW) .............................. 103140050 A

(51) Int. Cl.
*G09G 3/36* (2006.01)
*G02F 1/1343* (2006.01)
*G02F 1/1362* (2006.01)
*H01L 27/146* (2006.01)
*H01L 27/32* (2006.01)

(52) U.S. Cl.
CPC ..... *G09G 3/3648* (2013.01); *G02F 1/134309* (2013.01); *G02F 1/136213* (2013.01); *G02F 2001/134318* (2013.01)

(58) Field of Classification Search
None
See application file for complete search history.

(56) References Cited

U.S. PATENT DOCUMENTS

2005/0286003 A1* 12/2005 Lee ................... G02F 1/134363
349/141
2008/0225196 A1* 9/2008 Kim .................. G02F 1/136259
349/54

\* cited by examiner

*Primary Examiner* — Edward J Glick
*Assistant Examiner* — Anthony G Quash
(74) *Attorney, Agent, or Firm* — JCIPRNET

(57) ABSTRACT

A pixel structure is provided. The pixel structure includes a scan line and a data line, an active device, a pixel electrode, and a common electrode. The active device is electrically connected to the scan line and the data line. The pixel electrode is electrically connected to the active device. The common electrode is disposed to overlap with the pixel electrode. The common electrode is coupled to the pixel electrode to form a first storage capacitor and a second storage capacitor. The first storage capacitor and the second storage capacitor commonly use the pixel electrode as an upper electrode.

17 Claims, 9 Drawing Sheets

PIXEL STRUCTURE

CROSS-REFERENCE TO RELATED APPLICATION

This application is a divisional of and claims priority benefit of U.S. application Ser. No. 14/700,127, filed on Apr. 29, 2015, now allowed, which claims the priority benefit of Taiwan application serial no. 103140050, filed on Nov. 19, 2014. The entirety of each of the above-mentioned patent applications is hereby incorporated by reference herein and made a part of this specification.

BACKGROUND OF THE INVENTION

Field of the Invention

The invention relates to a pixel structure, and more particularly, relates to a pixel structure capable of preventing the cross-talk.

Description of Related Art

In conventional display panels, a common electrode is generally used as a shielding layer to prevent a parasitic capacitance from being generated between a data line and a pixel electrode. However, because the common electrode is a lower electrode of a capacitor, a common voltage of the common electrode is also under influence of signals from the data line to generate the cross-talk which changes a common voltage ($V_{com}$) and results in unstable display quality for the display panel.

SUMMARY OF THE INVENTION

The invention is directed a pixel structure which is capable of preventing the cross-talk.

The invention provides a pixel structure, which includes a scan line and a data line, an active device, a pixel electrode, and a common electrode. The active device is electrically connected to the scan line and the data line. The pixel electrode is electrically connected to the active device. The common electrode is disposed to overlap with the pixel electrode. The common electrode is coupled to the pixel electrode to form a first storage capacitor and a second storage capacitor. The first storage capacitor and the second storage capacitor commonly use the pixel electrode as an upper electrode.

The invention provides a pixel structure, which includes a scan line and a data line, an active device, a main pixel electrode, a sub pixel electrode, a main common electrode and a sub common electrode. The active device is electrically connected to the scan line and the data line. The main pixel electrode is electrically connected to the active device. The sub pixel electrode is electrically connected to the active device. The main common electrode is disposed to overlap with the main pixel electrode. The sub common electrode is disposed to overlap with the sub pixel electrode. The main common electrode is coupled to the main pixel electrode to form a first main storage capacitor and a second main storage capacitor, and the first main storage capacitor and the second main storage capacitor commonly use the main pixel electrode as a main upper electrode. The sub common electrode is coupled to the sub pixel electrode to form a first sub storage capacitor and a second sub storage capacitor, and the first sub storage capacitor and the second sub storage capacitor commonly use the sub pixel electrode as a sub upper electrode.

Based on the above, in the pixel structure of the invention, two storage capacitors are formed by coupling the common electrode and the pixel electrode. The two storage capacitors commonly use the pixel electrode as the upper electrode. Accordingly, the cross-talk caused by the data line may be prevented from influencing the common electrode, such that display quality of the display panel may be improved.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
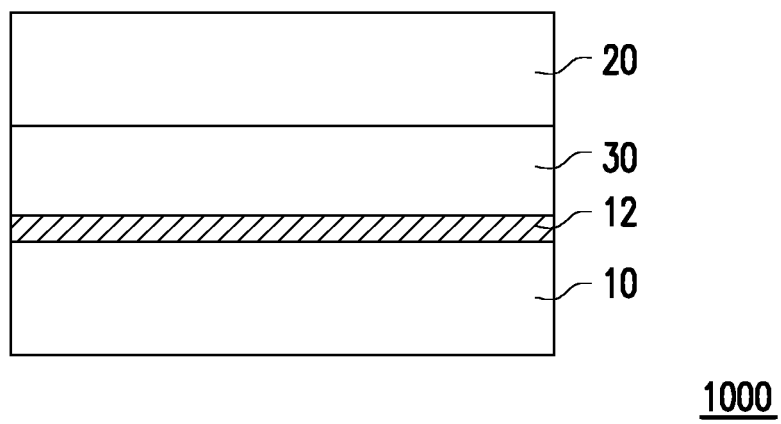
FIG. 1 is a cross-sectional view illustrating a display panel according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a cross-sectional view illustrating a display panel according to an embodiment of the invention. Referring to FIG. 1, a display panel 1000 includes a first substrate 10, a second substrate 20, a display medium 30 and a pixel array layer 12. The display panel 1000 may be a liquid crystal display (LCD) panel, an electrophoretic display panel or a display panel in other forms. In the present embodiment, the display panel 1000 is a vertical alignment (VA) liquid crystal display panel for example, and this VA liquid crystal display panel includes a high contrast characteristic in vertical alignment mode, but the invention is not limited thereto.

A material of the first substrate 10 is, for example, a glass, a quartz, an organic polymer, a metal, or the like. The second substrate 20 is disposed opposite to the first substrate 10. A material of the second substrate 20 is, for example, a glass, a quartz, an organic polymer, or the like.

The display medium 30 is disposed between the first substrate 12 located on the first substrate 10 and the second substrate 20. The display medium 30 includes a plurality of liquid crystal molecules (not illustrated), electrophoresis molecules or other display materials. The liquid crystal molecules may be positive liquid crystal molecules or negative liquid crystal molecules. Because a dielectric anisotropy (Δε) the negative liquid crystal molecules is less than 0, and the vertical alignment liquid crystal molecules have a high contrast ratio, the liquid crystal molecules in negative vertical alignment are capable of effectively increasing a contrast ratios and a visual angle while suppressing a color washout issue. The display medium 30 according to the embodiment of the present disclosure is the negative liquid crystal in vertical alignment, but the invention is not limited thereto.

The pixel array layer 12 is located on the first substrate 10, and the display medium 30 covers above the pixel array layer 12. The pixel array layer 12 is constituted in form of an array composed of a plurality of pixel structures. The pixel structure of the present embodiment is described more specifically below by reference with the drawings.

Figure 2:
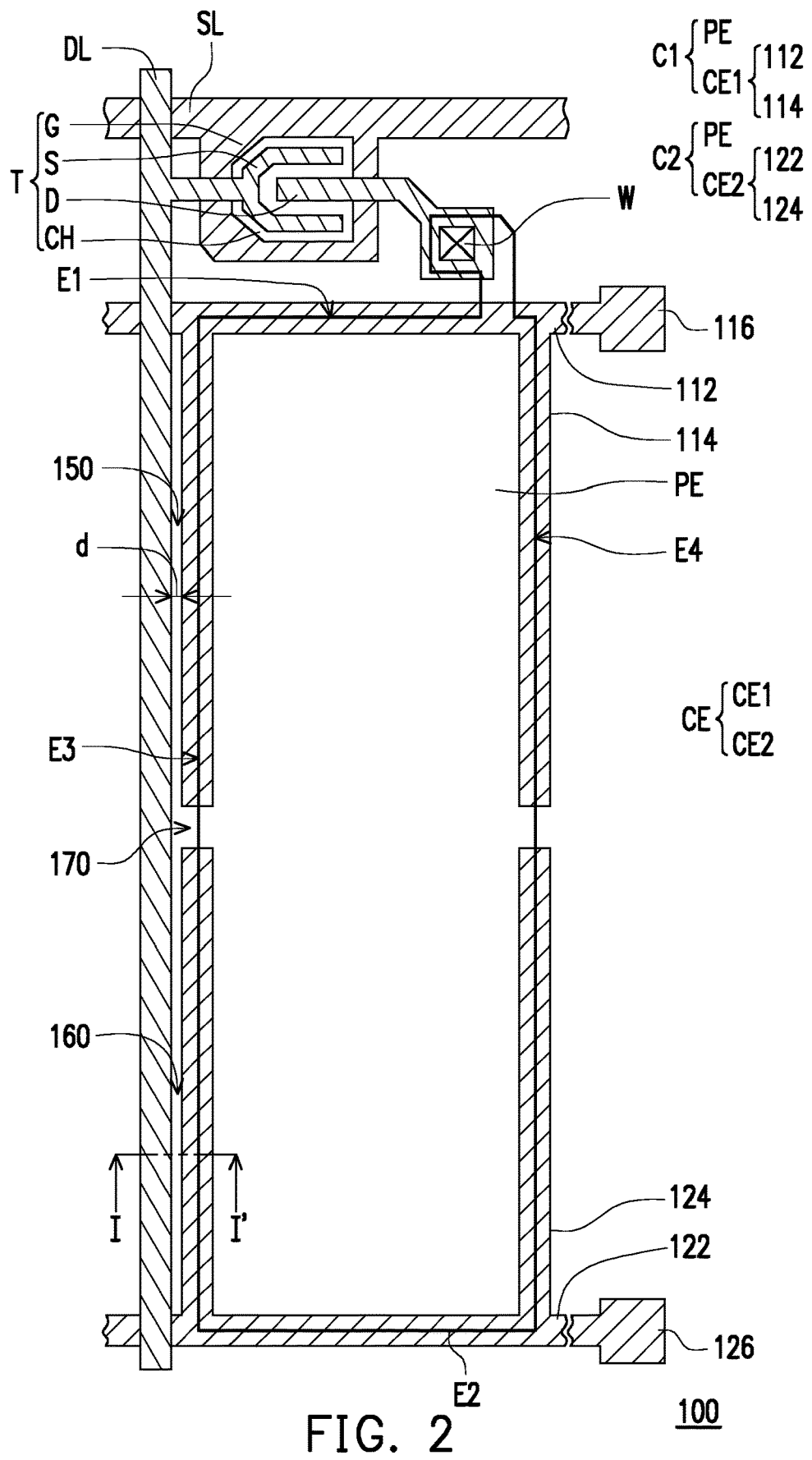
FIG. 2 is a top view illustrating a pixel structure according to an embodiment of the invention.
Figure 3:
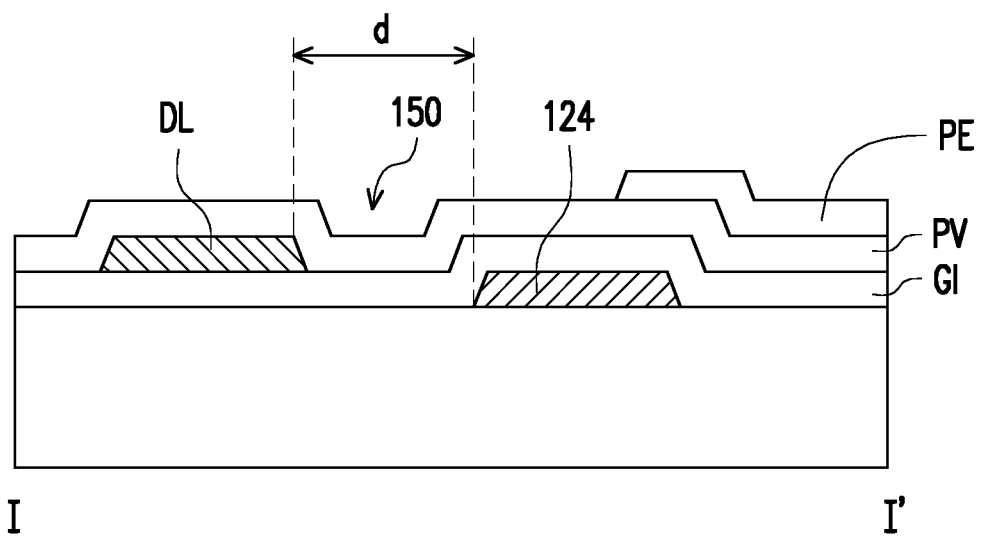
FIG. 3 is a cross-sectional view of FIG. 2 along a line I-I'.
Figure 4:
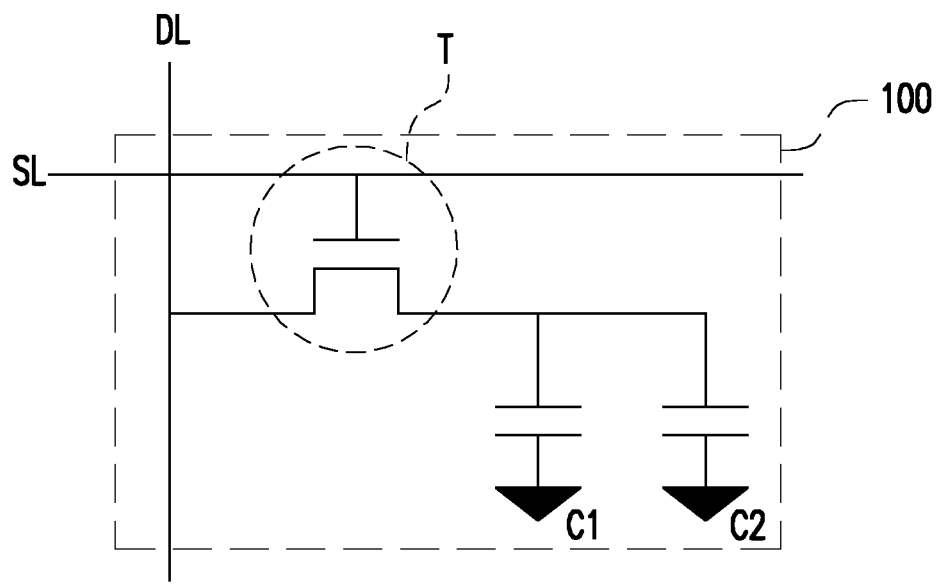
FIG. 4 is an equivalent circuit diagram of the pixel structure of FIG. 2.

Referring to FIG. 2, FIG. 3 and FIG. 4 together, FIG. 2 is a top view illustrating a pixel structure according to an embodiment of the invention, FIG. 3 is a cross-sectional view of FIG. 2 along a line I-I', and FIG. 4 is an equivalent circuit diagram of the pixel structure of FIG. 2. As shown in FIG. 2, a pixel structure 100 of the present embodiment includes a scan line SL, a data line DL, an active device T, a pixel electrode PE and a common electrode CE.

Extending directions of the scan line SL and the data line DL are different, and it is preferable that the extending direction of the scan line SL is perpendicular to the extending direction of the data line DL. Further, the scan line SL and the data liner DL are located in different layers, and an insulating layer (not illustrated) is disposed between the scan line SL and the data liner DL. The scan line SL and the data liner DL are mainly used to transmit a driving signal for driving the pixel structure 100. Generally, the scan line SL and the data liner DL are made of metal materials. However, the invention is not limited thereto. According to other embodiments, the scan line SL and the data line DL may also adopt uses of other conductive materials such as an alloy, an oxide of a metal material, a nitride of a metal material, a nitrogen oxide of a metal material or a stacked layer of a metal material and other conductive materials.

In the present embodiment, the active device T is electrically connected to the scan line SL and the data line DL. Herein, the active device T is, for example, a thin film transistor (TFT) which includes a gate G, a channel layer CH, a drain D and a source S. The gate G is electrically connected to the scan line SL, and the source S is electrically connected to the data line DL. In other words, when a control signal is inputted to the scan line SL, the scan line SL is electrically conduced with the gate G; and when the control signal is inputted to the data line DL, the data line DL is electrically conduced with the source S. The channel layer CH is located above the gate G and located under the source S and the drain D. The active device T of the present embodiment is described by using a bottom gate thin film transistor for example, but the invention is not limited thereto. In other embodiments, the active device T may also be a top gate thin film transistor.

The pixel electrode PE is electrically connected to the active device T. More specifically, the pixel electrode PE may be electrically connected to the drain D of the active device T through a contact window W. A material of the pixel electrode PE is, for example, a transparent conductive layer, which includes a metal oxide such as an indium tin oxide (ITO), an indium zinc oxide (IZO), an aluminum tin oxide (ATO), an aluminum zinc oxide (AZO), an indium gallium zinc oxide (IGZO) or other suitable metal oxides, or a stacked layer of at least two of the above.

In the pixel structure 100 of the present embodiment, the common electrode CE is disposed to overlap with the pixel electrode PE, such that the common electrode CE may be coupled to the pixel electrode PE to form a first storage capacitor C1 and a second storage capacitor C2 (as shown in FIG. 4). It is worth mentioning that, the first storage capacitor C1 and the second storage capacitor C2 commonly use the pixel electrode PE as an upper electrode. As shown in FIG. 2, the common electrode CE includes a first lower electrode CE1 of the first storage capacitor C1 and a second lower electrode CE2 of the second storage capacitor C2. A material of the common electrode CE includes a metal or a metal oxide such as an indium tin oxide, an indium zinc oxide, an aluminum tin oxide, an aluminum zinc oxide, an indium gallium zinc oxide or other suitable metal oxides, or a stacked layer of at least two of the above.

The first lower electrode CE1 includes a first main portion 112 and at least one first branch portion 114. The first main portion 112 is disposed along a direction of the scan line SL; and in the present embodiment, the first main portion 112 is disposed in parallel to the scan line SL, and the first main portion 112 crosses over the data line DL to partially overlap with the data line DL. As shown in FIG. 2, the common electrode CE of the present embodiment has two first branch portions 114, but the invention is not limited thereto. The first branch portion 114 is disposed along a direction of the data line DL; and in the present embodiment, the first branch portion 114 is connected to the first main portion 112 and disposed in parallel to the data line DL. More specifically, the first lower electrode CE1 of the present embodiment shows a "Π" shape, but the invention is not limited thereto. The first branch portion 114 is located between the pixel structure PE and the data line DL. It is worth mentioning that, a gap 150 is provided between the first branch portion 114 and the data line DL. In the present embodiment, a width d of the gap 150 is preferably to be less than 2.5 μm. In consideration of aperture ratio and light leakage prevention, the width d of the gap 150 is more preferably to be less than 1 μm. It is worth mentioning that, the gap 150 between the first branch portion 114 and the data line DL may be 0 μm, and the first branch portion 114 may even overlap with the data line DL. Because the gap 150 between the first branch portion 114 and the data line DL is relatively small, it is possible that signals on the data line DL may influence a potential stability of the common electrode CE (the first branch portion 114). Therefore, in addition to the first lower electrode CE1 being designed, the second lower electrode CE2 is further designed for the common electrode CE in the pixel structure of the present embodiment, and the first lower electrode CE1 and the second lower electrode CE2 are separated from each other such that the potential stability of the common electrode CE (the first branch portion 114) may be improved.

More specifically, the second lower electrode CE2 includes a second main portion 122 and at least one second branch portion 124. The second main portion 122 is disposed along the direction of the scan line SL; and in the present embodiment, the second main portion 122 is disposed in parallel to the scan line SL, and the second main portion 122 crosses over the data line DL to partially overlap with the data line DL. Further, as shown in FIG. 2, the second main portion 122 and the first main portion 112 are located at two opposite ends of the common electrode CE (i.e., disposed at two sides of the common electrode CE). The common electrode CE of the present embodiment has two second branch portions 124, but the invention is not limited thereto. The second branch portion 124 is disposed along the direction of the data line DL; and in the present embodiment, the second branch portion 124 is connected to the second main portion 122 and disposed in parallel to the data line DL. More specifically, the second lower electrode CE2 of the present embodiment shows an inverted "Π" shape, but the invention is not limited thereto. The second branch portion 124 is located between the pixel structure PE and the data line DL. It is worth mentioning that, a gap 160 is provided between the second branch portion 124 and the data line DL. In the present embodiment, the gap 160 has the same width d of the gap 150, but the invention is not limited thereto. Similarly, the width d of the gap 160 is preferably to be less than 2.5 µm. In consideration of aperture ratio and light leakage prevention, the width d of the gap 160 is more preferably to be less than 1 µm. It is worth mentioning that, the gap 160 between the first branch portion 114 and the data line DL may be 0 µm, and the first branch portion 114 may even overlap with the data line DL. Particularly, in the present embodiment, the second branch portion 124 and the first branch portion 114 are separated from each other by a gap 170 provided between the two. As long as the second branch portion 124 and the first branch portion 114 may be electrically isolated from each other, a width of the gap 170 is not particularly limited in the present embodiment.

In the present embodiment, the first lower electrode CE1 and the second lower electrode CE2 of the common electrode CE are equipotential. More specifically, as shown in FIG. 2, the first main portion 112 is electrically connected to a first pad 116, and the second main portion 122 is electrically connected to a second pad 126. The first pad 116 and the second pad 126 are electrically connected to a common voltage $V_{com}$, but the invention is not limited thereto. In the present embodiment, the common voltage $V_{com}$ is a DC power.

Referring back to FIG. 2, the pixel electrode PE has a first edge E1 and a second edge E2 opposite to each other and a third edge E3 and a fourth edge E4 opposite to each other. The first main portion 112 is disposed to overlap with the first edge E1, and the second main portion 122 is disposed to overlap with the second edge E2. The two first branch portions 114 are disposed to overlap with the third edge E3 and the fourth edge E4 respectively. The two second branch portions 124 are disposed to overlap with the third edge E3 and the fourth edge E4 respectively.

More specifically, a portion between the first main portion 112 and the pixel electrode PE is coupled to a portion between the first branch portion 114 and the pixel electrode PE to form the first storage capacitor C1. The first storage capacitor C1 has a first capacitance Ca. A portion between the second main portion 122 and the pixel electrode PE is coupled to a portion between the second branch portion 124 and the pixel electrode PE to form the second storage capacitor C2. The second storage capacitor C2 has a second capacitance Cb. In the present embodiment, Ca/2<Cb, but the invention is not limited thereto.

Referring to FIG. 3, a gate insulating layer GI is disposed between the data line DL and the second branch portion 124 of the second lower electrode CE2 of the common electrode CE, so that the data line DL and the second branch portion 124 are electrically isolated from each other. A material of the gate insulating layer GI is, for example, an inorganic material, an organic material or a combination thereof. The inorganic material includes, for example, a silicon oxide (SiO), a silicon nitride (SiN), a silicon oxynitride (SiON) or a stacked layer of at least two of the above materials. Further, an insulating layer PV is disposed above the data line DL and under the pixel structure PE. A material of the insulating layer PV is, for example, an inorganic material, an organic material or a combination thereof. The inorganic material includes, for example, a silicon oxide (SiO), a silicon nitride (SiN), a silicon oxynitride (SiON) or a stacked layer of at least two of the above materials.

In a single pixel structure as described above, the common electrode are divided into two portions for coupling the same pixel electrode in order to form two storage capacitors. In other words, the two common electrodes in said two storage capacitors commonly use the same pixel electrode as the upper electrode. The design of aforementioned pixel structure is capable of preventing the cross-talk caused by the data line to influence the common electrode, so as to improve display quality of the display panel.

Figure 5:
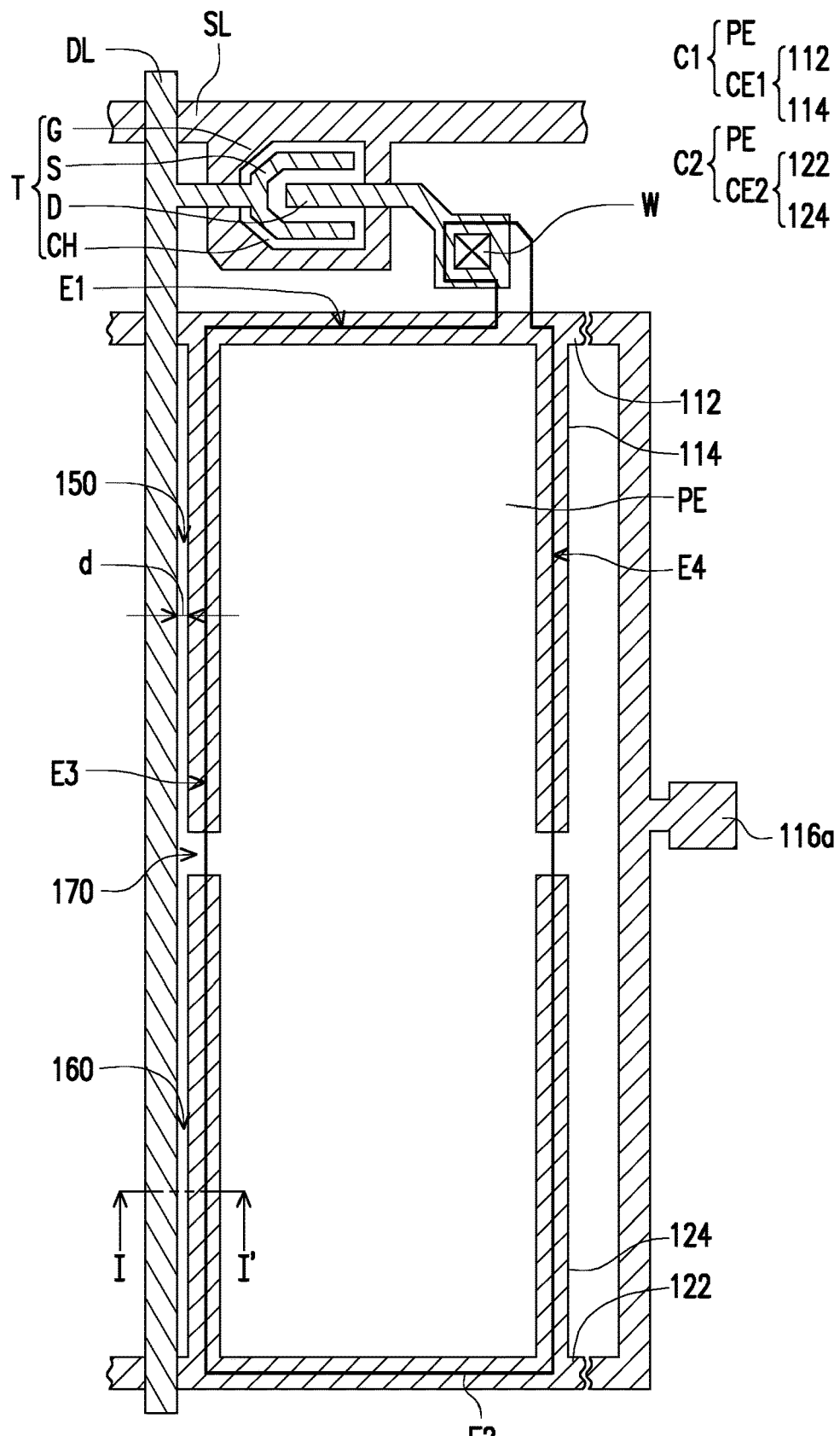
FIG. 5 is a top view illustrating a pixel structure according to another embodiment of the invention.

FIG. 5 is a top view illustrating a pixel structure according to another embodiment of the invention. Referring to FIG. 5, a pixel structure 100a is similar to the pixel structure 100 of FIG. 2, and thus similar or identical parts are indicated by similar or identical reference numbers and descriptions thereof are not repeated hereinafter. A major difference between the pixel structure 100a and the pixel structure 100 is that, the first main portion 112 and the second main portion 122 of the pixel structure 100a are connected together and electrically connected to the common voltage $V_{com}$ through a pad 116a. In other words, after extending to a peripheral region of the display panel, the first main portion 112 and the second main portion 122 are connected together through disposition of wirings and commonly connected to the pad 116a, and the common voltage $V_{com}$ are transmitted to the first main portion 112 and the second main portion 122 through the pad 116a.

Figure 6:
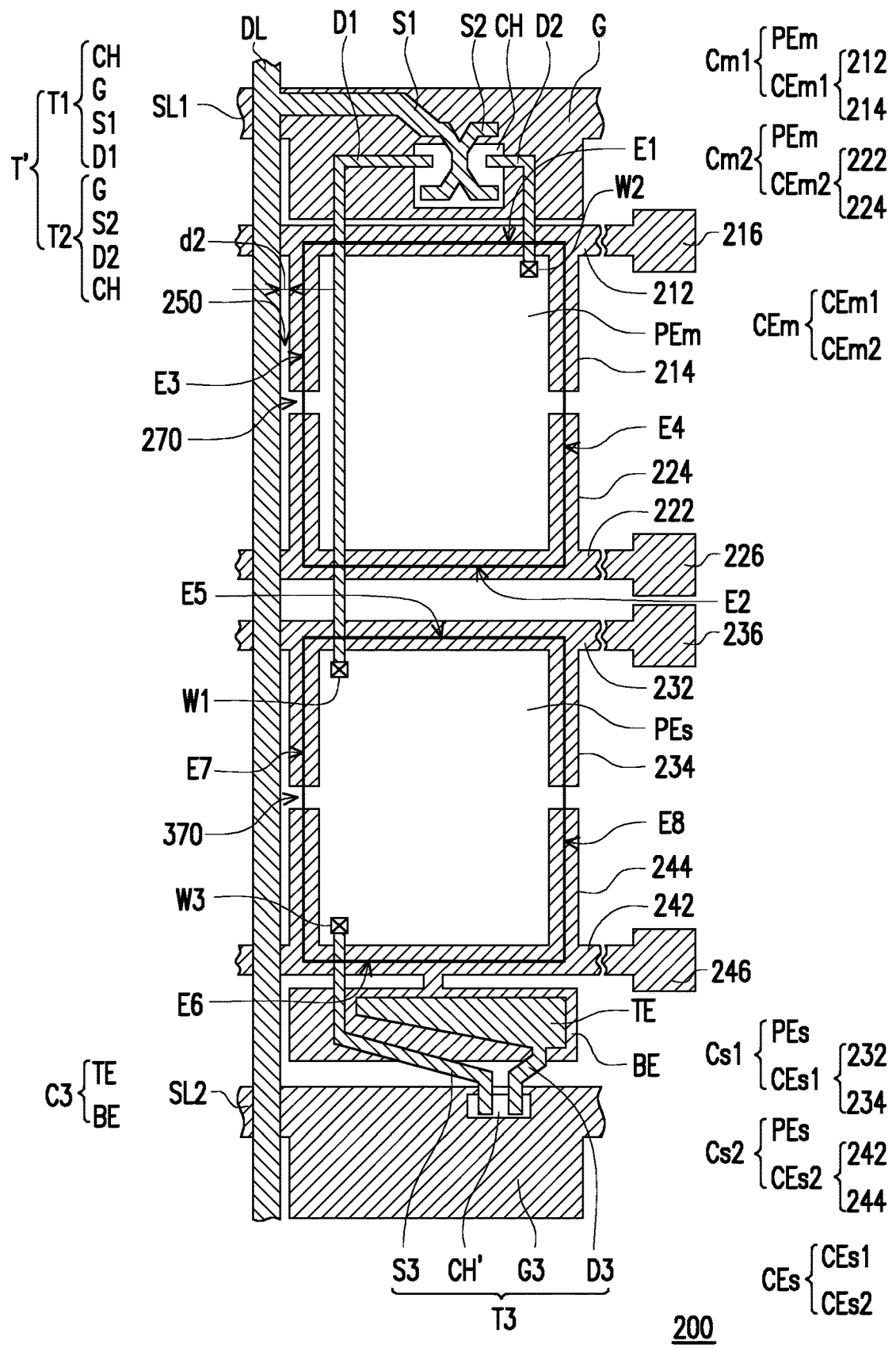
FIG. 6 is a top view illustrating a pixel structure according to another embodiment of the invention.

FIG. 6 is a top view illustrating a pixel structure according to another embodiment of the invention. Referring to FIG. 6, a pixel structure 200 of the present embodiment is similar to the pixel structure 100 of FIG. 2, and thus identical or similar parts are indicated by identical or similar reference numbers and descriptions thereof are not repeated hereinafter. In the present embodiment, an active device T' includes a first driving component T1 and a second driving component T2. The first driving component T1 and the second driving component T2 are similar to the active device T, which are the thin film transistors for example. The first driving component T1 is electrically connected to a scan line SL1 and the data line DL, and the second driving component T2 is also electrically connected to the scan line SL1 and the data line DL. More specifically, the first driving component T1 includes the gate G, the channel layer CH, a source S1 and a drain D1. The gate G is electrically connected to the scan line SL1. The channel layer CH is located above the gate G. The source S1 and the drain D1 are located above the channel layer CH. The source S1 is electrically connected to the data line DL. The second driving component T2 includes the gate G, the channel layer CH, a source S2 and a drain D2. The gate G is electrically connected to the scan line SL1. The channel layer CH is located above the gate G. The source S2 and the drain D2 are located above the channel layer CH. The source S2 is also electrically connected to the data line DL. In the present embodiment, the first driving component T1 and the second driving component T2 commonly use the same gate G and commonly use the same channel layer CH.

A major difference between the pixel structure 200 and the pixel structure 100 of FIG. 2 is that, a pixel electrode of the pixel structure 200 can be divided into a main pixel electrode PEm and a sub pixel electrode PEs, and a common electrode of the pixel structure 200 can be divided into a main common electrode CEm and a sub common electrode CEs. Accordingly, the pixel structure 200 of the present embodiment may be used to reduce occurrences of a color washout phenomenon for the display panel. Each of the main pixel electrode PEm and the sub pixel electrode PEs is electrically connected the active device T. More specifically, the main pixel electrode PEm may be directly in contact with the drain D2 of the second driving component T2 through a contact window W2, and the sub pixel electrode PEs may be directly in contact with the drain D1 of the first driving component T1 through a contact window W1.

As shown in FIG. 6, the pixel structure 200 further includes a sharing switch component T3. The sharing switch component T3 is electrically connected to the scan line SL2. The second driving component T3 includes a gate G3, a channel layer CH', a source S3 and a drain D3. The gate G3 is electrically connected to the scan line SL2. The channel layer CH' is located above the gate G3. The source S3 and the drain D3 are located above the channel layer CH'. In the present embodiment, the sharing switch component T3 is described by using a bottom gate thin film transistor for example, but the invention is not limited thereto. According to other embodiments, the sharing switch component T3 may also be a top gate thin film transistor.

Further, in the present embodiment, the sharing switch component T3 is electrically connected to the sub pixel electrode PEs. More specifically, as shown in FIG. 6, the source S3 of the sharing switch component T3 may be directly and electrically in contact with the sub pixel electrode PEs through a contact window W3.

In the pixel structure 200 of the present embodiment, the main common electrode CEm is disposed to overlap with the main pixel electrode PEm, such that the main common electrode CEm may be coupled to the main pixel electrode PEm to form a first main storage capacitor Cm1 and a second main storage capacitor Cm2. Similarly, the sub common electrode CEs is disposed to overlap with the sub pixel electrode PEs, such that the sub common electrode CEs may be coupled to the sub pixel electrode PEs to form a first sub storage capacitor Cs1 and a second sub storage capacitor Cs2. It is worth mentioning that, the first main storage capacitor Cm1 and the second main storage capacitor Cm2 commonly use the main pixel electrode PEm as a main upper electrode, and the first sub storage capacitor Cs1 and the second sub storage capacitor Cs2 commonly use the sub pixel electrode PEs as a sub upper electrode. As shown in FIG. 6, the main common electrode CEm includes a first main lower electrode CEm1 of the first main storage capacitor Cm1 and a second main lower electrode CEm2 of the main second storage capacitor Cm2. Similarly, the sub common electrode CEs includes a first sub lower electrode CEs1 of the first sub storage capacitor Cs1 and a second sub lower electrode CEs2 of the second sub storage capacitor Cs2.

More specifically, a portion between a first main portion 212 and the main pixel electrode PEm is coupled to a portion between a first branch portion 214 and the main pixel electrode PEm to form the first main storage capacitor Cm1. The first main storage capacitor Cm1 has a first capacitance Ca. A portion between a second main portion 222 and the main pixel electrode PEm is coupled to a portion between a second branch portion 224 and the main pixel electrode PEm to form the second main storage capacitor Cm2. The second main storage capacitor Cm2 has a second capacitance Cb. In the present embodiment, Ca/2<Cb, but the invention is not limited thereto. Similarly, a portion between a third main portion 232 and the sub pixel electrode PEs is coupled to a portion between a third branch portion 234 and the sub pixel electrode PEs to form the first sub storage capacitor Cs1. The first sub storage capacitor Cs1 has a third capacitance Cc. A portion between a fourth main portion 242 and the sub pixel electrode PEs is coupled to a portion between a fourth branch portion 244 and the sub pixel electrode PEs to form the second sub storage capacitor Cs2. The second sub storage capacitor Cs2 has a fourth capacitance Cd. In the present embodiment, Cc/2<Cd, but the invention is not limited thereto.

In addition, the pixel structure 200 of the present embodiment further includes a third storage capacitor C3. The third storage capacitor C3 is electrically connected to the sharing switch component T3. More specifically, the third storage capacitor C3 includes a third upper electrode TE and a third lower electrode BE. The third upper electrode TE is electrically connected to (e.g., directly and electrically in contact with) the drain D3 of the sharing switch component T3, and the third lower electrode BE is electrically connected to the common voltage $V_{com}$. According to the present embodiment, the third lower electrode BE is electrically connected to the common voltage $V_{com}$, through the second sub lower electrode CEs2 of the second sub storage capacitor Cs2.

The first main lower electrode CEm1 includes the first main portion 212 and at least one first branch portion 214. The first main portion 212 is disposed along the direction of the scan line SL; and in the present embodiment, the first main portion 212 is disposed in parallel to the scan line SL. The first branch portion 214 is disposed along the direction of the data line DL; and in the present embodiment, the first branch portion 214 is connected to the first main portion 212 and disposed in parallel to the data line DL. Further, the first branch portion 214 is located between the main pixel structure PEm and the data line DL. The second main lower electrode CEm2 includes the second main portion 222 and at least one second branch portion 224. The second main portion 222 is disposed along the direction of the scan line SL; and in the present embodiment, the second main portion 222 is disposed in parallel to the scan line SL. The first main portion 212 and the second main portion 222 are electrically connected to the common voltage $V_{com}$. The second branch portion 224 is disposed along the direction of the data line DL; and in the present embodiment, the second branch portion 224 is connected to the second main portion 222 and disposed in parallel to the data line DL. The second branch portion 224 is located between the main pixel structure PEm and the data line DL. Particularly, in the present embodiment, the second branch portion 224 and the first branch portion 214 are separated from each other by a gap 270 provided between the two. As long as the second branch portion 224 and the first branch portion 214 may be electrically isolated from each other, a width of the gap 270 is not particularly limited in the present embodiment.

Similarly, in the present embodiment, the first sub lower electrode CEs1 includes the third main portion 232 and at least one third branch portion 234. The third main portion 232 is disposed along the direction of the scan line SL. The third branch portion 234 is connected to the third main portion 232 and disposed in parallel to the data line DL. Further, the third branch portion 234 is located between the sub pixel structure PEs and the data line DL. The second sub lower electrode CEs2 includes the fourth main portion 242 and at least one fourth branch portion 244. The fourth main portion 242 is disposed along the direction of the scan line SL. The third main portion 232 and the fourth main portion 242 are electrically connected to the common voltage $V_{com}$. The fourth branch portion 244 is connected to the fourth main portion 242 and disposed in parallel to the data line DL. The fourth branch portion 244 is located between the sub pixel structure PEs and the data line DL. Particularly, in the present embodiment, the fourth branch portion 244 and the third branch portion 234 are separated from each other by a gap 370 provided between the two. As long as the third branch portion 234 and the fourth branch portion 244 may be electrically isolated from each other, a width of the gap 370 is not particularly limited in the present embodiment.

As shown in FIG. 6, the first main portion 212, the second main portion 222, the third main portion 232 and the fourth main portion 242 all cross over the data line DL to partially overlap with the data line DL. It is worth mentioning that, a gap 250 is provided between the first branch portion 214, the second branch portion 224, the third branch portion 234, the fourth branch portion 244 and the data line DL. In the present embodiment, a width d2 of the gap 250 is preferably to be less than 2.5 µm. In consideration of aperture ratio and light leakage prevention, the width d2 of the gap 250 is more preferably to be less than 1 µm. It is worth mentioning that, the gap 250 may be 0 µm, and the first branch portion 214, the second branch portion 224, the third branch portion 234, the fourth branch portion 244 may even partially overlap with the data line DL.

The main pixel electrode PEm has a first edge E1 and a second edge E2 opposite to each other and a third edge E3 and a fourth edge E4 opposite to each other. The first main portion 212 and the second main portion 222 are disposed to overlap the first edge E1 and the second edge E2 respectively, and the first branch portion 214 and the second branch portion 224 are disposed to overlap with the third edge E3 and the fourth edge E4 respectively. The sub pixel electrode PEs has a fifth edge E5 and a sixth edge E6 opposite to each other and a seventh edge E7 and an eighth edge E8 opposite to each other. The third main portion 232 and the fourth main portion 242 are disposed to overlap with the fifth edge E5 and the sixth edge E6 respectively. The third branch portion 234 and the fourth branch portion 244 are disposed to overlap with the seventh edge E7 and the eighth edge E8 respectively.

In the present embodiment, the main common electrode CEm and the sub common electrode CEs are equipotential. More specifically, the first main portion 212 of the main common electrode CEm is electrically connected to a first pad 216, the second main portion 222 of the main common electrode CEm is electrically connected to a second pad 226, the third main portion 232 of the sub common electrode CEs is electrically connected to a third pad 236, and the fourth main portion 242 of the sub common electrode CEs is electrically connected to a fourth pad 246. The first pad 216, the second pad 246, the third pad 236 and the fourth pad 246 are electrically connected to the common voltage $V_{com}$, but the invention is not limited thereto.

Figure 7:
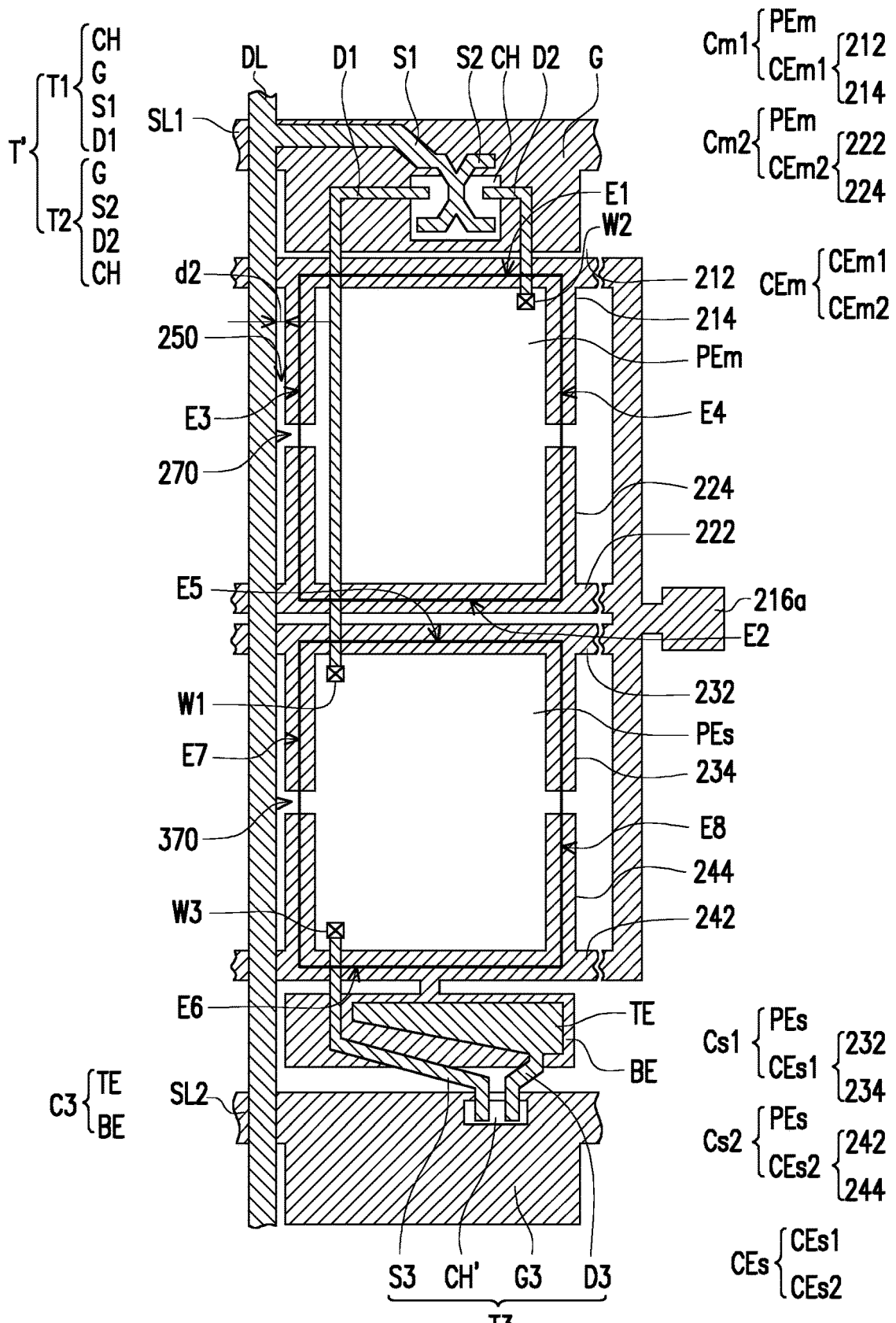
FIG. 7 is a top view illustrating a pixel structure according to another embodiment of the invention.

FIG. 7 is a top view illustrating a pixel structure according to another embodiment of the invention. Referring to FIG. 7, a pixel structure 200a is similar to the pixel structure 200, and thus similar or identical parts are indicated by similar or identical reference numbers and descriptions thereof are not repeated hereinafter. A major difference between the pixel structure 200a and the pixel structure 200 is that, the first main portion 212, the second main portion 222, the third main portion 232 and the fourth main portion 242 of the pixel structure 200a are connected together and electrically connected to the common voltage $V_{com}$ through a pad 216a.

In other words, after extending to a peripheral region of the display panel, the first main portion 212, the second main portion 222, the third main portion 232 and the fourth main portion 242 are connected together through disposition of wirings and commonly connected to the pad 216a, and the common voltage $V_{com}$ are transmitted to the first main portion 212, the second main portion 222, the third main portion 232 and the fourth main portion 242 through the pad 216a.

Figure 8:
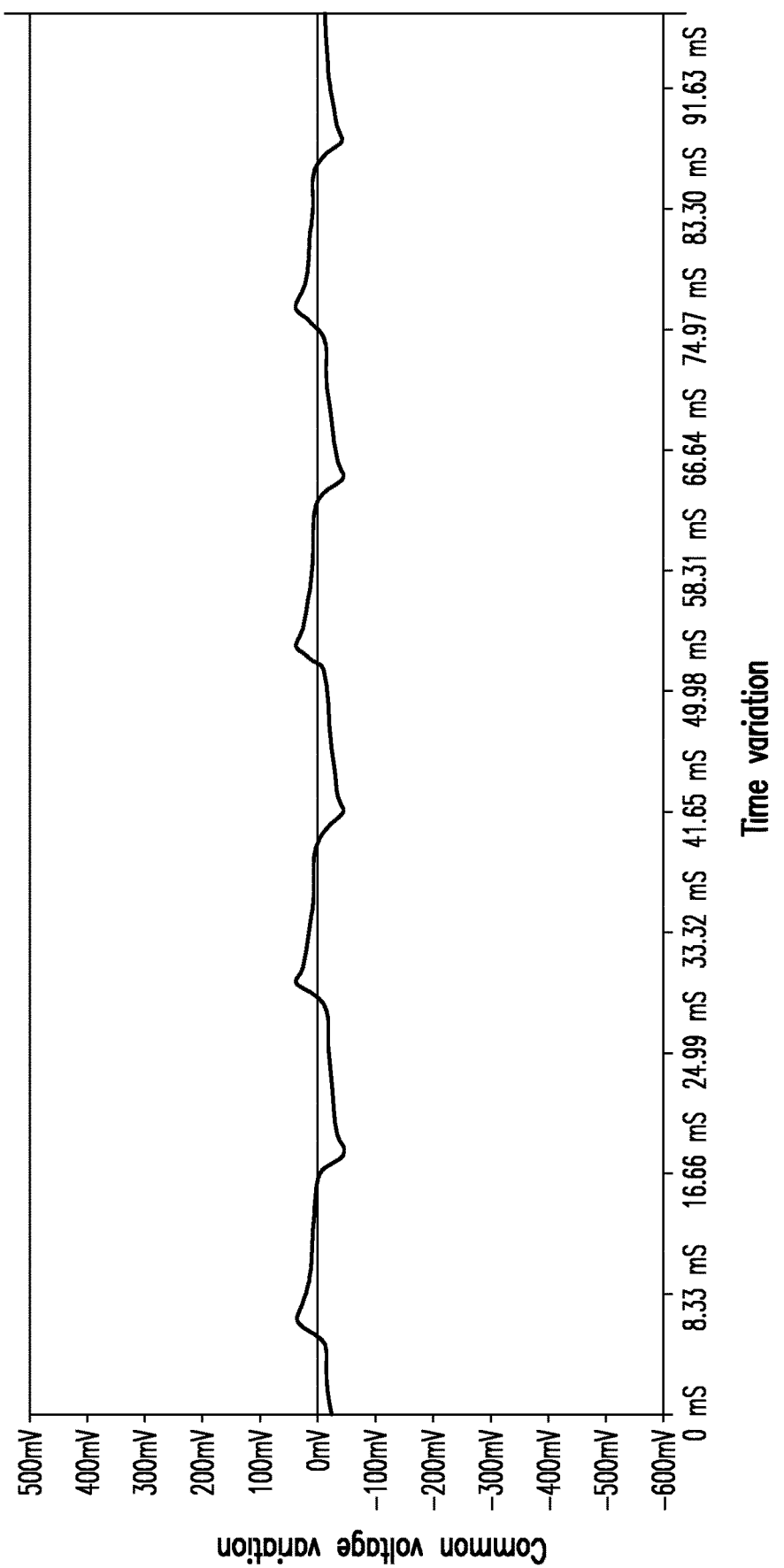
FIG. 8 is a common voltage variation curve diagram of a conventional pixel structure.
Figure 9:
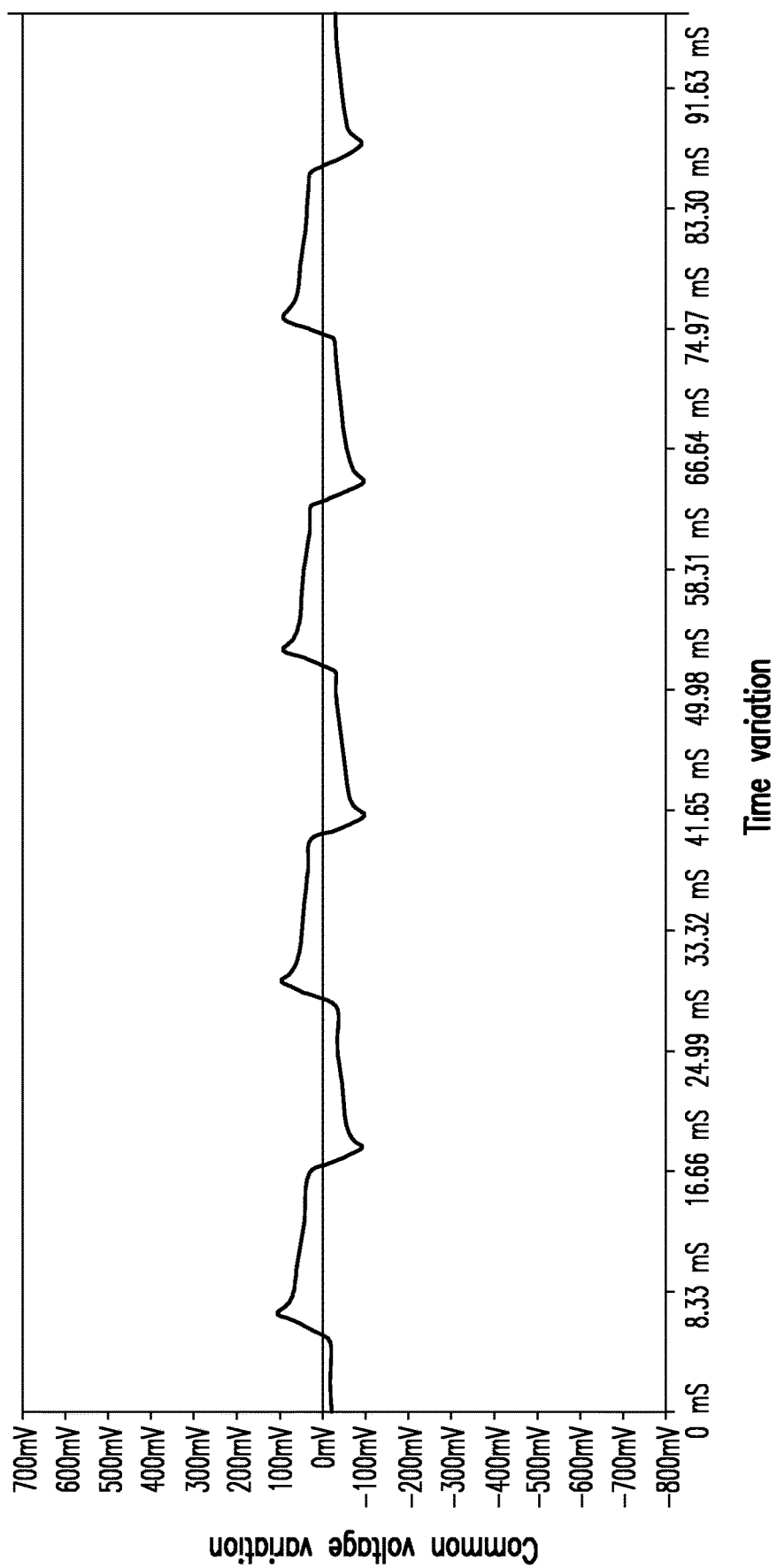
FIG. 9 is a common voltage variation curve diagram of the pixel structure according to an embodiment of the invention.
Figure 10:
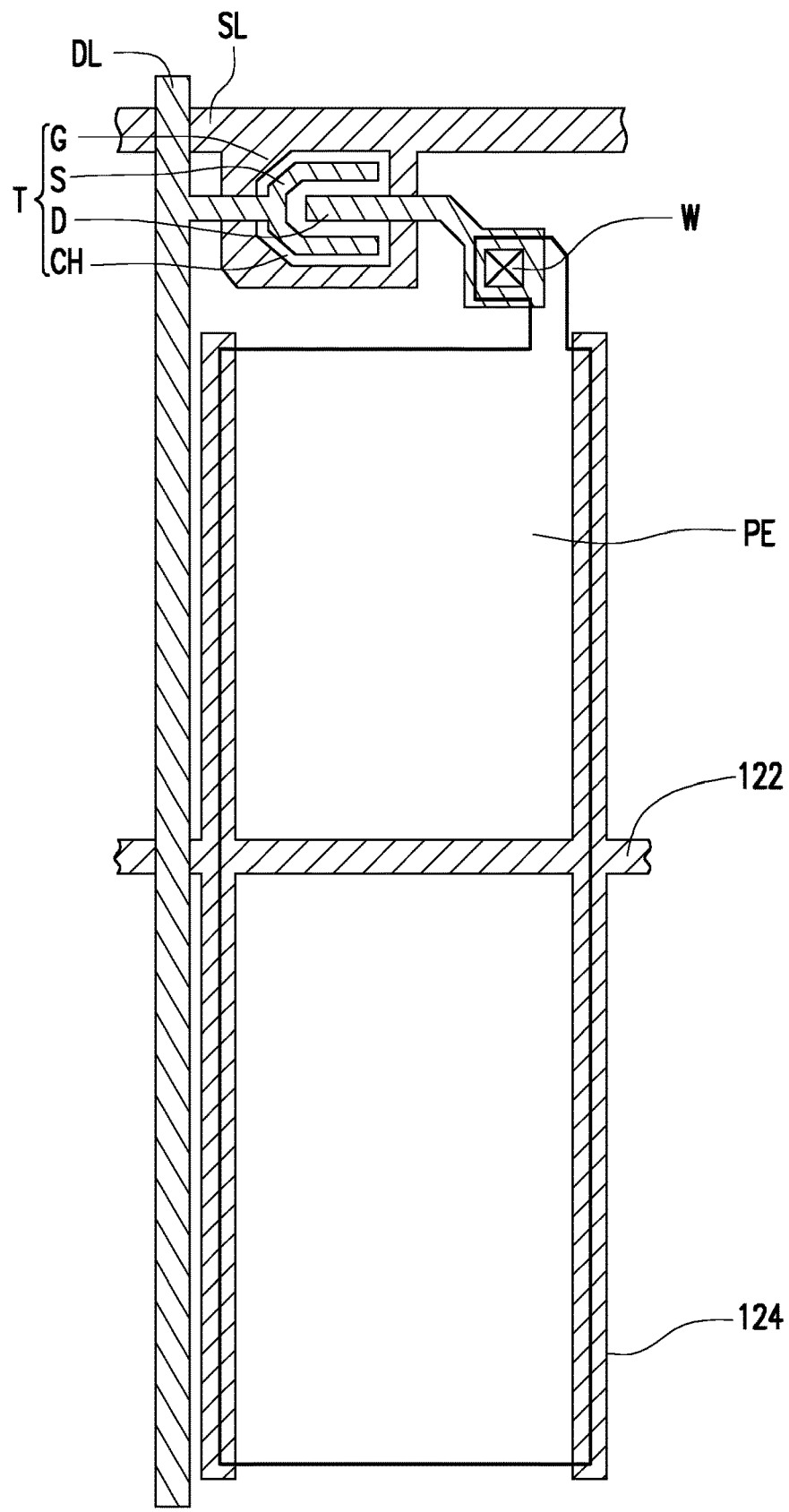
FIG. 10 is a top view of a conventional pixel structure.

FIG. 8 is a common voltage variation curve diagram of a conventional pixel structure. FIG. 9 is a common voltage variation curve diagram of the pixel structure according to an embodiment of the invention. The common voltage variation curve diagram of FIG. 9 is obtained by measuring the pixel structure of FIG. 2, and the common voltage variation curve diagram of FIG. 8 is obtained by measuring a conventional pixel structure of FIG. 10. A difference between the conventional pixel structure of FIG. 10 and the pixel structure of FIG. 2 is that the conventional pixel structure does not adopt the design of the two common electrodes. Referring to FIG. 8 and FIG. 9 together, in which a vertical axis refers to a common voltage variation and a horizontal axis refers to a time variation. In view of results in FIG. 8 and FIG. 9, it can be known that the common voltage variation of the pixel structure according to an embodiment of the invention is relatively less as compared to the common voltage variation of the conventional pixel structure. Accordingly, display quality of the display panel according to an embodiment of the invention may be improved.

In summary, in the pixel structure of the invention, two storage capacitors are formed by coupling the common electrode and the pixel electrode. In other words, the common electrodes in the two storage capacitors commonly use the same pixel electrode as the upper electrode. As a result, the pixel structure of the invention is capable of preventing the cross-talk caused by the data line to influence the common electrode, so as to improve display quality of the display panel.

Although the present disclosure has been described with reference to the above embodiments, it will be apparent to one of ordinary skill in the art that modifications to the described embodiments may be made without departing from the spirit of the present disclosure. Accordingly, the scope of the present disclosure will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A pixel structure, comprising:
a scan line and a data line;
an active device, electrically connected to the scan line and the data line;
a main pixel electrode, electrically connected to the active device;
a sub pixel electrode, electrically connected to the active device;
a main common electrode, disposed to overlap with the main pixel electrode, and
a sub common electrode, disposed to overlap with the sub pixel electrode, wherein the main common electrode is coupled to the main pixel electrode to form a first main storage capacitor and a second main storage capacitor, and the first main storage capacitor and the second main storage capacitor commonly use the main pixel electrode as a main upper electrode; and the sub common electrode is coupled to the sub pixel electrode to form a first sub storage capacitor and a second sub storage capacitor, and the first sub storage capacitor and the second sub storage capacitor commonly use the sub pixel electrode as a sub upper electrode.

2. The pixel structure of claim 1, wherein the main common electrode comprises a first main lower electrode of the first main storage capacitor and a second main lower electrode of the second main storage capacitor; the sub common electrode comprises a first sub lower electrode of the first sub storage capacitor and a second sub lower electrode of the second sub storage capacitor, wherein the first main lower electrode comprises:
    a first main portion, disposed along a direction of the scan line; and
    at least one first branch portion, connected to the first main portion and disposed along a direction of the data line, wherein the at least one first branch portion is located between the main pixel structure and the data line; and the second main lower electrode comprises:
    a second main portion, disposed along the direction of the scan line, wherein the first main portion and the second main portion are electrically connected to a common voltage; and
    at least one second branch portion, connected to the second main portion and disposed along the direction of the data line, wherein the at least one second branch portion is located between the main pixel structure and the data line, and the at least one second branch portion is structurally separated from the at least one first branch portion;

the first sub lower electrode comprises:
    a third main portion, disposed along the direction of the scan line; and
    at least one third branch portion, connected to the third main portion and disposed along the direction of the data line, wherein the at least one third branch portion is located between the sub pixel structure and the data line; and the second sub lower electrode comprises:
    a fourth main portion, disposed along the direction of the scan line, wherein the third main portion and the fourth main portion are electrically connected to a common voltage; and
    at least one fourth branch portion, connected to the fourth main portion and disposed along the direction of the data line, wherein the at least one fourth branch portion is located between the sub pixel structure and the data line, and the at least one fourth branch portion is structurally separated from the at least one third branch portion.

3. The pixel structure of claim 2, wherein the first main portion, the second main portion, the third main portion and the fourth main portion cross over the data line to partially overlap with the data line.

4. The pixel structure of claim 2, wherein a gap is provided between the data line and the at least one first branch portion, between the data line and the at least one second branch portion, between the data line and the at least one third branch portion, between the data line and the at least one fourth branch portion, and the gap is less than 2.5 μm.

5. The pixel structure of claim 2, wherein the at least one first branch portion, the at least one second branch portion, the at least one third branch portion and the at least one fourth branch portion partially overlap with the data line.

6. The pixel structure of claim 2, wherein
the main pixel electrode has a first edge and a second edge opposite to each other and a third edge and a fourth edge opposite to each other, the first main portion is disposed to overlap with the first edge, the second main portion is disposed to overlap with the second edge, the at least one first branch portion is disposed to overlap with the third edge and the fourth edge, and the at least one second branch portion is disposed to overlap with the third edge and the fourth edge, and the sub pixel electrode has a fifth edge and a sixth edge opposite to each other and a seventh edge and an eighth edge opposite to each other, the third main portion is disposed to overlap with the fifth edge, the fourth main portion is disposed to overlap with the sixth edge, the at least one third branch portion is disposed to overlap with the seventh edge and the eighth edge, and the at least one fourth branch portion is disposed to overlap with the seventh edge and the eighth edge.

7. The pixel structure of claim 2, wherein
the first main portion is coupled to the main pixel electrode and the at least one first branch portion is coupled to the main pixel electrode so as to form the first main storage capacitor, and the first main storage capacitor has a first capacitance Ca, the second main portion is coupled to the main pixel electrode and the at least one second branch portion is coupled to the main pixel electrode so as to form the second main storage capacitor, and the second main storage capacitor has a second capacitance Cb, wherein Ca/2<Cb, and the third main portion is coupled to the sub pixel electrode and the at least one third branch portion is coupled to the sub pixel electrode so as to form the first sub storage capacitor, and the first sub capacitor has a third capacitance Cc, the fourth main portion is coupled to the sub pixel electrode and the at least one fourth branch portion is coupled to the sub pixel electrode so as to form the second sub storage capacitor, and the second sub capacitor has a fourth capacitance Cd, wherein Cc/2<Cd.

8. The pixel structure of claim 2, wherein the first main portion, the second main portion, the third main portion and the fourth main portion are structurally connected together to be commonly and electrically connected to the common voltage.

9. The pixel structure of claim 2, wherein the first main portion is electrically connected to a first pad, the second main portion is electrically connected to a second pad, the third main portion is electrically connected to a third pad, the fourth main portion is electrically connected to a fourth pad, and the first pad, the second pad, the third pad and the fourth pad are electrically connected to the common voltage.

10. A pixel structure, comprising:
a scan line and a data line;
an active device, electrically connected to the scan line and the data line;
a main pixel electrode, electrically connected to the active device, wherein the main pixel electrode has a first edge and a second edge opposite to each other and a third edge and a fourth edge opposite to each other;

a sub pixel electrode, electrically connected to the active device, wherein the sub pixel electrode has a fifth edge and a sixth edge opposite to each other and a seventh edge and an eighth edge opposite to each other;

a main common electrode, disposed to overlap with the main pixel electrode and comprises a first main lower electrode having a first main portion and at least one first branch portion connected to the first main portion and a second main lower electrode having a second main portion and at least one second branch portion connected to the second main portion, and a sub common electrode, disposed to overlap with the sub pixel electrode and comprises a first sub main lower electrode having a third main portion and at least one third branch portion connected to the third main portion and a second sub main lower electrode having a fourth main portion and at least one fourth branch portion connected to the fourth main portion, wherein the main common electrode is coupled to the main pixel electrode to form a first main storage capacitor and a second main storage capacitor, wherein the first main portion is disposed to overlap with the first edge, the second main portion is disposed to overlap with the second edge, the at least one first branch portion is disposed to overlap with the third edge and the fourth edge, the at least one second branch portion is disposed to overlap with the third edge and the fourth edge, and wherein the sub common electrode is coupled to the sub pixel electrode to form a first sub storage capacitor and a second sub storage capacitor, wherein the third main portion is disposed to overlap with the fifth edge, the fourth main portion is disposed to overlap with the sixth edge, the at least one third branch portion is disposed to overlap with the seventh edge and the eighth edge, and the at least one fourth branch portion is disposed to overlap with the seventh edge and the eighth edge.

11. The pixel structure of claim 10, wherein the first main storage capacitor and the second main storage capacitor commonly use the main pixel electrode as a main upper electrode, and the first sub storage capacitor and the second sub storage capacitor commonly use the sub pixel electrode as a sub upper electrode, wherein the first main lower electrode comprises:
the first main portion, disposed along a direction of the scan line; and
the at least one first branch portion, disposed along a direction of the data line, wherein the at least one first branch portion is located between the main pixel structure and the data line; and the second main lower electrode comprises:
the second main portion, disposed along the direction of the scan line, wherein the first main portion and the second main portion are electrically connected to a common voltage; and
the at least one second branch portion, disposed along the direction of the data line, wherein the at least one second branch portion is located between the main pixel structure and the data line, and the at least one second branch portion is structurally separated from the at least one first branch portion;

the first sub lower electrode comprises:
the third main portion, disposed along the direction of the scan line; and the at least one third branch portion, disposed along the direction of the data line, wherein the at least one third branch portion is located between the sub pixel structure and the data line; and the second sub lower electrode comprises:
the fourth main portion, disposed along the direction of the scan line, wherein the third main portion and the fourth main portion are electrically connected to a common voltage; and
the at least one fourth branch portion, disposed along the direction of the data line, wherein the at least one fourth branch portion is located between the sub pixel structure and the data line, and the at least one fourth branch portion is structurally separated from the at least one third branch portion.

12. The pixel structure of claim 10, wherein the first main portion, the second main portion, the third main portion and the fourth main portion cross over the data line to partially overlap with the data line.

13. The pixel structure of claim 10, wherein a gap is provided between the data line and the at least one first branch portion, between the data line and the at least one second branch portion, between the data line and the at least one third branch portion, between the data line and the at least one fourth branch portion, and the gap is less than 2.5 µm.

14. The pixel structure of claim 10, wherein the at least one first branch portion, the at least one second branch portion, the at least one third branch portion and the at least one fourth branch portion partially overlap with the data line.

15. The pixel structure of claim 10, wherein
the first main portion is coupled to the main pixel electrode and the at least one first branch portion is coupled to the main pixel electrode so as to form the first main storage capacitor, and the first main storage capacitor has a first capacitance Ca,
the second main portion is coupled to the main pixel electrode and the at least one second branch portion is coupled to the main pixel electrode so as to form the second main storage capacitor, and the second main storage capacitor has a second capacitance Cb, wherein Ca/2<Cb, and
the third main portion is coupled to the sub pixel electrode and the at least one third branch portion is coupled to the sub pixel electrode so as to form the first sub storage capacitor, and the first sub capacitor has a third capacitance Cc,
the fourth main portion is coupled to the sub pixel electrode and the at least one fourth branch portion is coupled to the sub pixel electrode so as to form the second sub storage capacitor, and the second sub capacitor has a fourth capacitance Cd, wherein Cc/2<Cd.

16. The pixel structure of claim 10, wherein the first main portion, the second main portion, the third main portion and the fourth main portion are structurally connected together to be commonly and electrically connected to the common voltage.

17. The pixel structure of claim 10, wherein the first main portion is electrically connected to a first pad, the second main portion is electrically connected to a second pad, the third main portion is electrically connected to a third pad, the fourth main portion is electrically connected to a fourth pad, and the first pad, the second pad, the third pad and the fourth pad are electrically connected to the common voltage.

\* \* \* \* \*

UNITED STATES PATENT AND TRADEMARK OFFICE
CERTIFICATE OF CORRECTION

PATENT NO. : 10,902,805 B2
APPLICATION NO. : 16/182614
DATED : January 26, 2021
INVENTOR(S) : Hung-Che Lin et al.

Page 1 of 1

It is certified that error appears in the above-identified patent and that said Letters Patent is hereby corrected as shown below:

On the Title Page

Item (62) should be corrected to read:
Division of application No. 14/700,127, filed on Apr. 29, 2015, now Pat. No. 10,163,412

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*